(12) United States Patent
Wisley et al.

(10) Patent No.: US 12,078,493 B2
(45) Date of Patent: Sep. 3, 2024

(54) WORKSITE MANAGEMENT SYSTEM

(71) Applicant: Caterpillar SARL, Geneva (CH)

(72) Inventors: David Richard Wisley, Darlington (GB); Paul Minniss, County Durham (GB); Jonathan Moses, County Durham (GB); Christopher Mullins, Middlesbrough (GB); Russell Pugh, County Durham (GB); Anthony James Pollock, Cleveland (GB); David Thompson, County Durham (GB); Thomas Henry Abel, North Yorkshire (GB)

(73) Assignee: Caterpillar SARL, Geneva (CH)

( * ) Notice: Subject to any disclaimer, the term of this patent is extended or adjusted under 35 U.S.C. 154(b) by 91 days.

(21) Appl. No.: 16/772,245

(22) PCT Filed: Dec. 12, 2018

(86) PCT No.: PCT/EP2018/025316
§ 371 (c)(1),
(2) Date: Jun. 12, 2020

(87) PCT Pub. No.: WO2019/115016
PCT Pub. Date: Jun. 20, 2019

(65) Prior Publication Data
US 2021/0102813 A1    Apr. 8, 2021

(30) Foreign Application Priority Data

Dec. 13, 2017    (GB) ...................................... 1720735

(51) Int. Cl.
*G01C 21/34*    (2006.01)
*G01C 21/00*    (2006.01)
(Continued)

(52) U.S. Cl.
CPC ..... *G01C 21/3407* (2013.01); *G01C 21/3826* (2020.08); *G05D 1/0011* (2013.01);
(Continued)

(58) Field of Classification Search
CPC ............ G01C 21/3407; G01C 21/3826; G01C 21/20; G01C 21/005; G05D 1/0011;
(Continued)

(56) References Cited

U.S. PATENT DOCUMENTS

| 5,504,482 A | 4/1996 | Schreder |
| 7,421,334 B2 | 9/2008 | Dahlgren et al. |

(Continued)

FOREIGN PATENT DOCUMENTS

| EP | 3101503 A1 | 12/2016 |
| GB | 2373117 A | 9/2002 |

(Continued)

OTHER PUBLICATIONS

GB Search Report related to Application No. 1720735.8 dated May 24, 2018.
(Continued)

*Primary Examiner* — Abdalla A Khaled

(57) ABSTRACT

A worksite management system for a worksite includes a sensor module associated with each of one or more machines working on the worksite. The sensor module generates a signal indicative of a location of a corresponding one of a machine from the one or more machines. An on-board controller associated with each of the one or more machines receives the signal corresponding to the location of the corresponding one of the machine on the worksite, and looks up the location of the corresponding one of the machine in at least one of a pre-generated or learned terrain map of a network of haul routes. The on-board controller identifies at least one condition of the haul route at the
(Continued)

looked-up location, and then generates an alert for an operator to perform one or more recommended actions with respect to an operating parameter of the corresponding one of the machine.

12 Claims, 8 Drawing Sheets

(51) Int. Cl.
   *G05D 1/00* (2006.01)
   *G08G 1/0962* (2006.01)
(52) U.S. Cl.
   CPC ......... *G05D 1/0223* (2013.01); *G05D 1/0291* (2013.01); *G08G 1/09626* (2013.01)
(58) Field of Classification Search
   CPC ............... G05D 1/0223; G05D 1/0291; G08G 1/09626; E02F 9/2054; E02F 9/262; G07C 5/008; G07C 5/0825
   See application file for complete search history.

(56) References Cited

U.S. PATENT DOCUMENTS

| | | |
|---|---|---|
| 7,571,029 B2 | 8/2009 | Dai et al. |
| 8,271,165 B2 | 9/2012 | Greiner et al. |
| 9,483,056 B2 | 11/2016 | Kanai et al. |
| 9,644,978 B2 | 5/2017 | Lewis et al. |
| 9,709,391 B2 | 7/2017 | Bando et al. |
| 2004/0122580 A1* | 6/2004 | Sorrells .................. G07C 5/008 701/80 |
| 2005/0065711 A1* | 3/2005 | Dahlgren ......... G08G 1/096775 701/117 |
| 2009/0299630 A1 | 12/2009 | Demar |
| 2010/0131147 A1 | 5/2010 | Donnelli |
| 2012/0083995 A1* | 4/2012 | Vorona ................. G08G 1/0141 701/119 |
| 2013/0060458 A1* | 3/2013 | Makela ................. E21F 13/025 701/301 |
| 2014/0032061 A1* | 1/2014 | Wulf ..................... E02F 9/2025 701/51 |
| 2014/0210644 A1 | 7/2014 | Breed |
| 2014/0214238 A1* | 7/2014 | Braunstein ........... G07C 5/0808 701/2 |
| 2015/0235557 A1* | 8/2015 | Engelman ........ G08G 1/096708 701/24 |
| 2016/0042644 A1* | 2/2016 | Velusamy ........ G08G 1/096775 340/435 |
| 2016/0176338 A1* | 6/2016 | Husted ..................... E02F 9/24 340/435 |
| 2016/0334798 A1* | 11/2016 | Foster .................. A01B 69/008 |
| 2017/0017235 A1* | 1/2017 | Tanaka ................. G05D 1/0297 |
| 2017/0129496 A1* | 5/2017 | Li ..................... B60W 50/0097 |
| 2017/0205241 A1* | 7/2017 | Lewis .................. G07C 5/0816 |
| 2018/0073208 A1* | 3/2018 | Wilson .................. E02F 9/2054 |
| 2018/0081368 A1* | 3/2018 | Watanabe ............ G05D 1/0285 |
| 2018/0164119 A1* | 6/2018 | Becker ................ B60W 60/001 |
| 2018/0215391 A1* | 8/2018 | Chen .................... B60W 40/06 |
| 2018/0286246 A1* | 10/2018 | Baca ...................... G08G 1/162 |
| 2019/0176833 A1* | 6/2019 | Ekonen ..................... A61F 2/82 |
| 2019/0186086 A1* | 6/2019 | Masuda ................. G06Q 50/08 |
| 2019/0294167 A1* | 9/2019 | Kutila .............. G08G 1/096791 |

FOREIGN PATENT DOCUMENTS

| | | |
|---|---|---|
| WO | WO 2004/092876 A2 | 10/2004 |
| WO | 2009011630 W | 1/2009 |
| WO | WO 2016/170855 A1 | 10/2016 |

OTHER PUBLICATIONS

International Search Report related to Application No. PCT/EP2018/025316; dated Mar. 8, 2019.

* cited by examiner

WORKSITE MANAGEMENT SYSTEM

CROSS-REFERENCE TO RELATED APPLICATION

This Application is a 35 USC § 371 US National Stage filing of International Application No. PCT/EP2018/025316 filed on Dec. 12, 2018 which claims priority under the Paris Convention to GB Patent Application No. 1720735.8 filed on Dec. 13, 2017.

TECHNICAL FIELD

The present disclosure relates generally to a worksite management system. More specifically, the present disclosure relates to controlling a powertrain of a machine based on conditions of haul routes on the worksite.

BACKGROUND

Mining, construction, and other large-scale excavating operations require fleets of digging, loading, and hauling machines to remove and transport excavated material such as ore and overburden from an area of excavation to a processing location. For such an operation to be profitable, the fleet of machines must be productively and efficiently operated. Many factors can influence productivity and efficiency at a worksite including, among other things, site conditions (e.g. rain, snow, ground moisture levels, material composition, visibility, terrain contour, route conditions, etc.), machine conditions (e.g. age, state of disrepair, malfunction, fuel grade in use, payload, tire pressure, etc.) and machine operation (e.g. machine speed, steering, braking, retardation, etc.)

When a machine is manufactured, it is conservatively configured for operation under a particular set of theoretical conditions and cannot be reconfigured easily after being commissioned to match actual conditions found at different worksites. Conditions of haul routes is a vital parameter which has large scale implications on operator ride comfort and machine maintenance costs. The haul routes get deteriorated due to continuous usage over time, and need to be repaired. Typically, a small portion of haul routes having a rough area, such as presence of potholes, ditches etc., causes most of the maintenance costs and operator discomfort. Therefore, if the operator may be made aware of such conditions on the haul route, appropriate measures may be taken.

An example of such a system may be provided by U.S. Pat. No. 7,421,334 which describes an on-board intelligent vehicle system. The on-board intelligent vehicle system includes a sensor assembly to collect data and a processor to process the data to determine the occurrence of at least one event. The data may be collected from existing standard equipment such as the vehicle communication bus or add-on sensors. The data may be indicative of conditions relating to the vehicle, routeway infrastructure, and routeway utilization, such as vehicle performance, routeway design, routeway conditions, and traffic levels. The detection of an event may signify abnormal, substandard, or unacceptable conditions prevailing in the routeway, vehicle, or traffic. The vehicle transmits an event indicator and correlated vehicle location data to a central facility for further management of the information. The central facility sends communications reflecting event occurrence to various relevant or interested users. The user population can include other vehicle subscribers (e.g., to provide rerouting data based on location-relevant routeway or traffic events), routeway maintenance crews, vehicle manufacturers, and governmental agencies (e.g., transportation authorities, law enforcement, and legislative bodies).

SUMMARY OF THE DISCLOSURE

In an aspect of the present disclosure, a worksite management system for a worksite is provided. The worksite has one or more machines operating on a network of haul routes. The worksite management system includes a sensor module associated with each of the one or more machines. The sensor module generates a signal indicative of a location of a corresponding one of a machine from the one or more machines on the worksite. The worksite management system includes an on-board controller associated with each of the one or more machines. The on-board controller is communicably coupled to the sensor module. The on-board controller has a memory for including at least one of a pre-generated or a learned terrain map of the network of haul routes. The on-board controller of each of the one or more machines receives the signal corresponding to the location of the corresponding one of the machine on the worksite. The on-board controller looks up the location of the corresponding one of the machine in the terrain map of the network of haul routes. The on-board controller identifies at least one condition of the haul route at the looked-up location based on an information terrain map. The on-board controller generates an alert for an operator to perform one or more recommended actions with respect to an operating parameter of the corresponding one of the machine based on the at least one identified condition.

In another aspect of the present disclosure, a machine is provided. The machine works on a network of haul routes on a worksite. The machine includes a power source, a pair of ground engaging elements, and a powertrain which transfers power from the power source to the pair of ground engaging elements. The machine includes a sensor module which generates a signal indicative of a location of the machine on the worksite. The machine includes an on-board controller communicably coupled to the sensor module. The on-board controller has a memory for including at least one of a pre-generated or a learned terrain map of the network of haul routes. The on-board controller of the machine receives the signal corresponding to the location of the machine on the worksite. The on-board controller of the machine looks up the location of the machine in the terrain map of the network of haul routes. The on-board controller of the machine identifies at least one condition of the haul route at the looked-up location based on an information included in the terrain map. The on-board controller of the machine generates an alert for an operator to perform one or more recommended actions with respect to an operating parameter of the machine based on the at least one identified condition.

In yet another aspect of the present disclosure, a method of managing a worksite is provided. The worksite has one or more machines operating on a network of haul routes. Each of the one or more machines includes an on-board controller having at least one of a pre-generated or a learned terrain map of the network of haul routes. The method includes receiving a signal indicative of a location of a corresponding one of the machine from the one or more machines on the worksite by an on-board controller of the corresponding one of the machine from the one or more machines. The method includes looking up the location of the corresponding one of the machine in the terrain map of the network of haul routes by the on-board controller of the corresponding one of the machine. The method includes identifying at least one condition of the haul route at the looked-up location based on an information included in the terrain map by the on-board controller of the corresponding one of the machine. The method further includes generating an alert for an operator to perform one or more recommended actions with respect to an operating parameter of the corresponding one of the machine based on the at least one identified condition by the on-board controller of the corresponding one of the machine.

DETAILED DESCRIPTION

Figure 1:
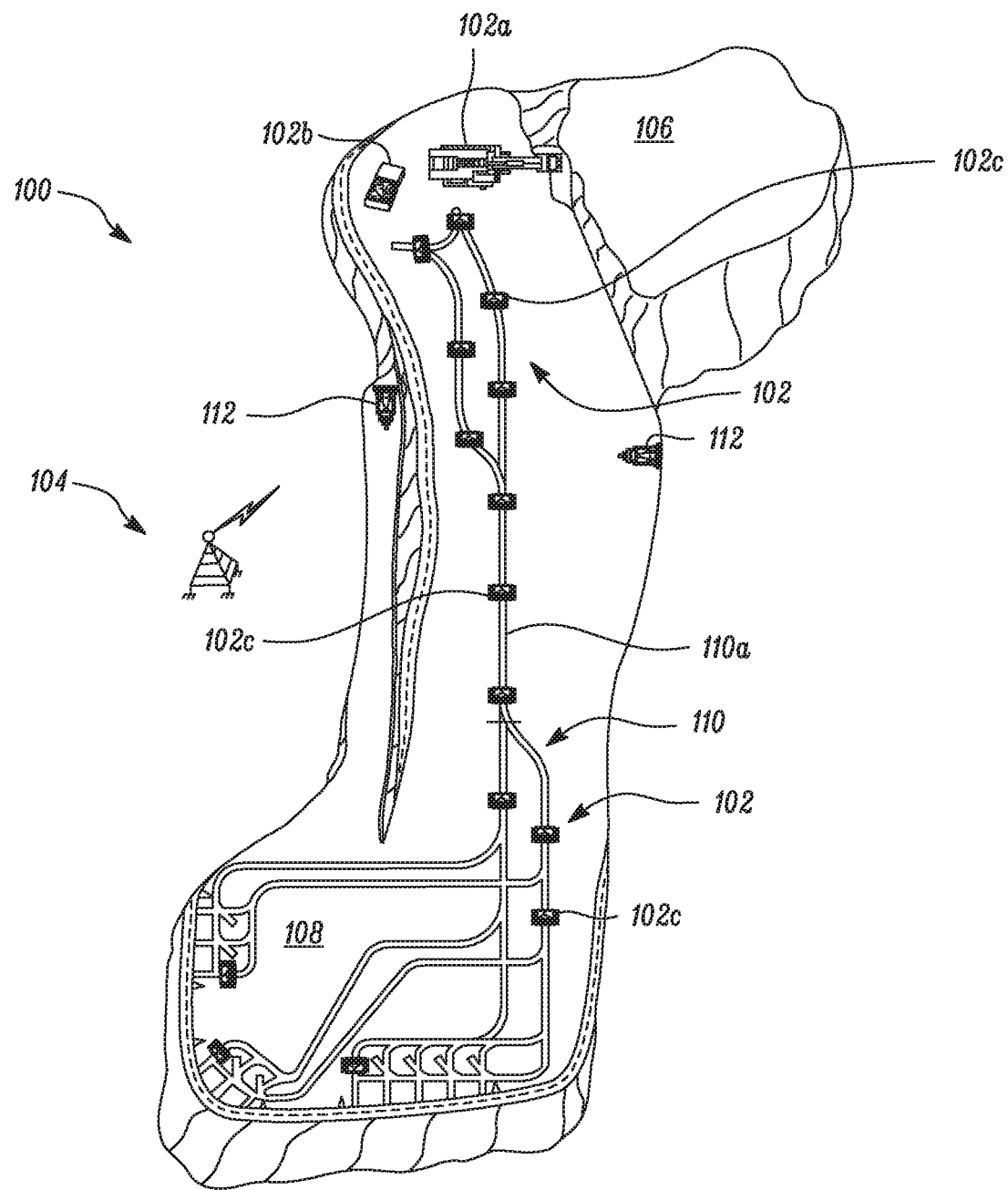
FIG. 1 is a pictorial representation of an exemplary worksite having a plurality of machines working on a network of haul routes, according to an aspect of the present disclosure.

Wherever possible, the same reference numbers will be used throughout the drawings to refer to same or like parts. FIG. 1 illustrates an exemplary worksite 100 having multiple, simultaneously-operable machines 102 performing a variety of predetermined tasks. The worksite 100 may include, for example, a mine site, a landfill, a quarry, a construction site, or any other type of work surface known in the art. The predetermined tasks may be associated with altering the current geography at the worksite 100 and include a clearing operation, a leveling operation, a hauling operation, a digging operation, a loading operation, a dumping operation, or any other type of operation that functions to alter the current geography at the worksite 100.

Various types of machines 102 may operate at or between different locations of the worksite 100. These machines 102 may include, digging machines 102a, loading machines 102b, hauling machines 102c, transport machines (not shown), and any other types of machines known in the art. A digging machine 102a may refer to any machine that reduces material at worksite 100 for the purpose of subsequent operations (e.g., for blasting, loading, and hauling operations). Examples of the digging machines 102a may include excavators, backhoes, dozers, drilling machines, trenchers, drag lines, etc. Multiple digging machines 102a may be co-located within a common area at the worksite 100 and may perform similar functions. Each of the machines 102 working at the worksite 100 may be in communication with each other and with a central station 104 to remotely transmit and receive operational data and instructions. The machines 102 may communicate with each other and the central station 104 through various communication medium such as Bluetooth®, Wi-Fi®, internet connectivity, cellular networks, Near Field Communication (NFC) etc.

A loading machine 102b may refer to any machine that lifts, carries, and/or loads material that has been reduced by the digging machine 102a onto waiting hauling machines 102c. Examples of the loading machine 102b may include a wheeled or tracked loader, a front shovel, an excavator, a cable shovel, a stack reclaimer, or any other similar machine. One or more loading machines 102b may operate within common areas of the worksite 100 to load reduced materials onto the hauling machines 102c. A hauling machine 102c may refer to any machine that carries the excavated materials between different locations within the worksite 100. Examples of the hauling machine 102c may include an articulated truck, an off-highway truck, an on-highway dump truck, a wheel tractor scraper, or any other similar machine.

The worksite 100 may include multiple locations designated for particular purposes. For example, the worksite 100 includes a load location 106, at which the loading machine 102b or any other such resource operates to fill the multiple hauling machines 102c with material. The worksite 100 may also include a dump location 108, at which the hauling machines 102c discharge their payloads. In the illustrated embodiment, the dump location 108 is positioned at an edge of a steep incline or cliff area known as a "high-wall". In this embodiment, the hauling machines 102c may be tasked with discharging their payloads over the edge or crest of the high-wall. Accordingly, the worksite 100 may be a considered a "high-wall operation". It should be understood that the worksite 100 is illustrated as an exemplary worksite 100, and the present disclosure is not limited by a particular type of the worksite 100 in any manner.

The machines 102 travel over a network of haul routes 110. The network of haul routes 110 includes multiple haul routes which are interconnected to each other. The network of haul routes 110 is designed to connect various locations on the worksite 100 such as the load location 106, the dump location 108 etc. with each other. FIG. 1 provides an exemplary embodiment for the network of haul routes 110. For example, the hauling machines 102c may follow a main haul route 110a that generally extends between the load location 106 and the dump locations 108. One or more additional mobile dozing, grading, or other clean-up machines 112 at the worksite 100 may be tasked with clearing or leveling the load location 102, the dump location 108, and/or the main haul route 110a such that travel by the hauling machines 102c at these locations may be possible.

As the hauling machines 102c operate at the worksite 100, the shapes, dimensions, and general positions of the load location 102, the dump location 108, and the main haul route 110a may change. The hauling machines 102c may be self-directed machines configured to autonomously traverse the changing terrain of the worksite 100, manned machines configured to traverse the worksite 100 under the control of an operator, or hybrid machines configured to perform some functions autonomously and other functions under the control of the operator.

Figure 2:
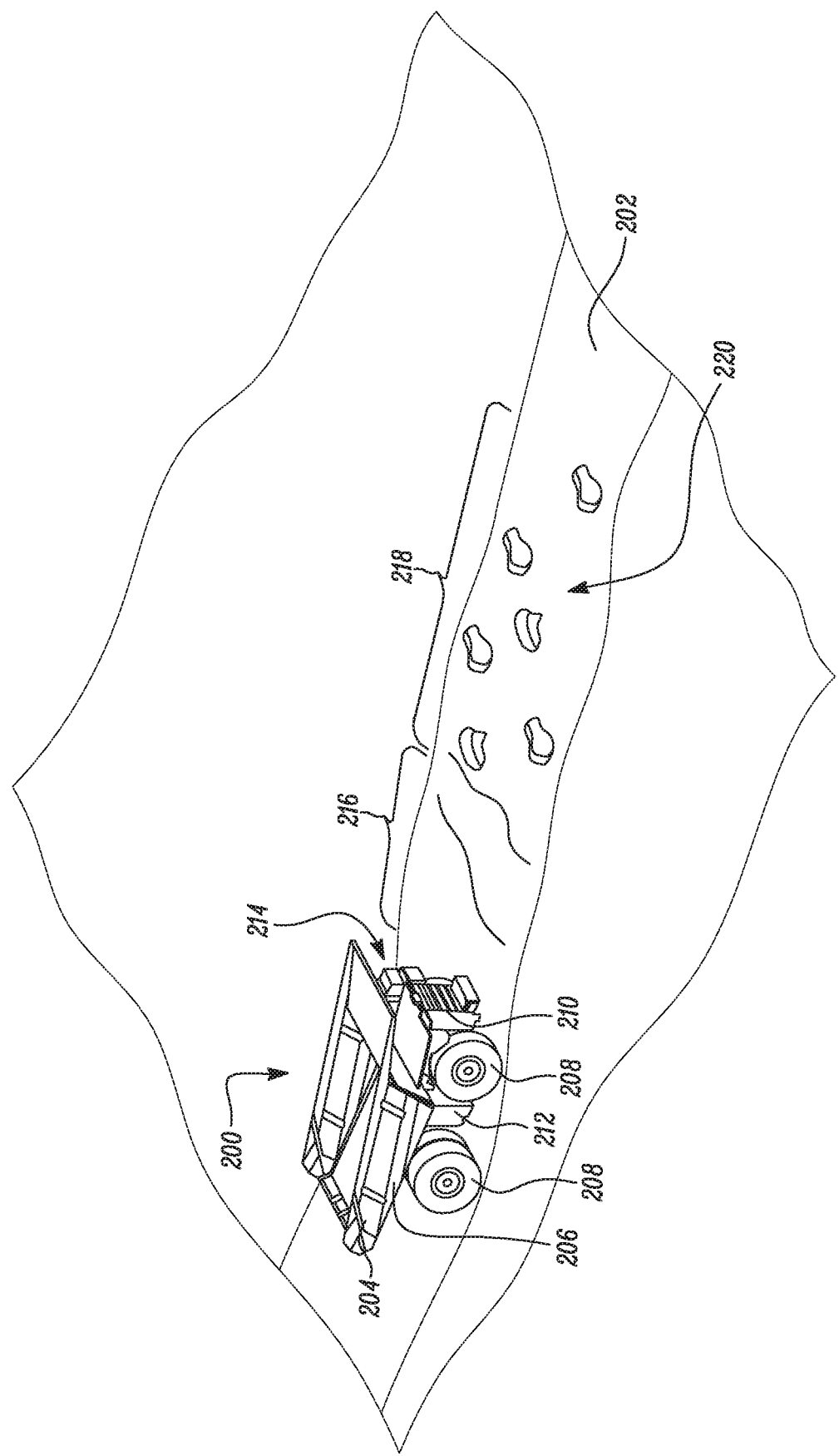
FIG. 2 shows a machine working on a haul route on the worksite, according to an aspect of the present disclosure.

FIG. 2 shows an exemplary machine 200 that may be operated at the worksite 100. Although there are multiple machines 102 working at the worksite 100, only one machine 200 is illustrated for the sake of clarity of explanation. The machine 200 is illustrated as travelling on a haul route 202 from the network of haul routes 110. It should be noted that, although the depicted machine 200 may embody a hauling machine, the following description may be equally applied to any other type of machine operating at the worksite 100 as well. The machine 200 includes a dump body 204 supported on a chassis 206. The dump body 204 may be tilted relative to the chassis 206 to empty a material being carried by the machine 200. The chassis 206 is supported on a ground surface of the haul route 202 by a pair of ground engaging elements 208.

The ground engaging elements 208 support the machine 200 on the ground surface, and help propel the machine 200 on the network of haul routes 110. The machine 200 includes a power source 210 to provide power for propulsion of the machine 200 as well as for performing other operations such as tilting the dump body 204 etc. The power source 210 may be an internal combustion engine. The machine 200 further includes a powertrain 212 to transfer the power provided by the power source 210 to the ground engaging elements 208. The powertrain 212 may include various components such as a flywheel, a drive shaft, a gear train, clutches etc., which are not being discussed in the context of the present disclosure in detail, as the present disclosure is not limited by any such components in any manner.

The machine 200 further includes an operator cab 214. The operator cab 214 may include various control systems and components required to operate the machine 200. The operator cab 214 may include one or more user interface (not shown) which may be used by an operator to operate the machine 200, to monitor various operating parameters of the machine 200, or to receive information about various parts and components of the machine 200 etc. The user interface may be any type of a user interface such as a joystick, a keypad, a touchscreen, a display screen etc., which may be suitable for application with various aspects of the present disclosure. The machine 200 may further include other parts and components such as a suspension system, a steering system, a dump body hoisting system etc. However, any such parts and components are not being discussed in detail in the context of the present disclosure, as the present disclosure is not limited by any such parts and components in any manner.

The machine 200 travels on the worksite 100 by traversing the network of haul routes 110. FIG. 2 illustrates the machine 200 travelling on the haul route 202 from the network of haul routes 110. The haul route 202 may have varying conditions at different locations across the worksite 100. For example, the haul route 202 may include one or more rough areas 220 such as pot holes, route surface corrugation, rutting, loose material, excessive dustiness, surface cracks, etc. at various locations on the haul route 202.

As illustrated, the haul route 202 may be envisioned as a combination of a first segment 216, and a second segment 218. The first segment 216 is a plain surface free from any of the aforementioned rough areas. For such a stretch of the haul route 202, there may not be any requirement for the operator to take any precautions, or safety measures etc., and the operator may drive the machine 200 without any discomfort to the operator, or any substantial damage to the machine 200. The second segment 218 includes the one or more rough areas 220 over the haul route 202. When the operator drives the machine 200 over the rough area 220 of the haul route 202, the operator may experience substantial discomfort, and the suspension system of the machine 200 may experience excessive load due to the rough area 220. The rough area 220 may cause operator discomfort, or substantial damage to the machine 200 subsequently incurring operator fatigue and maintenance costs respectively.

Figure 3:
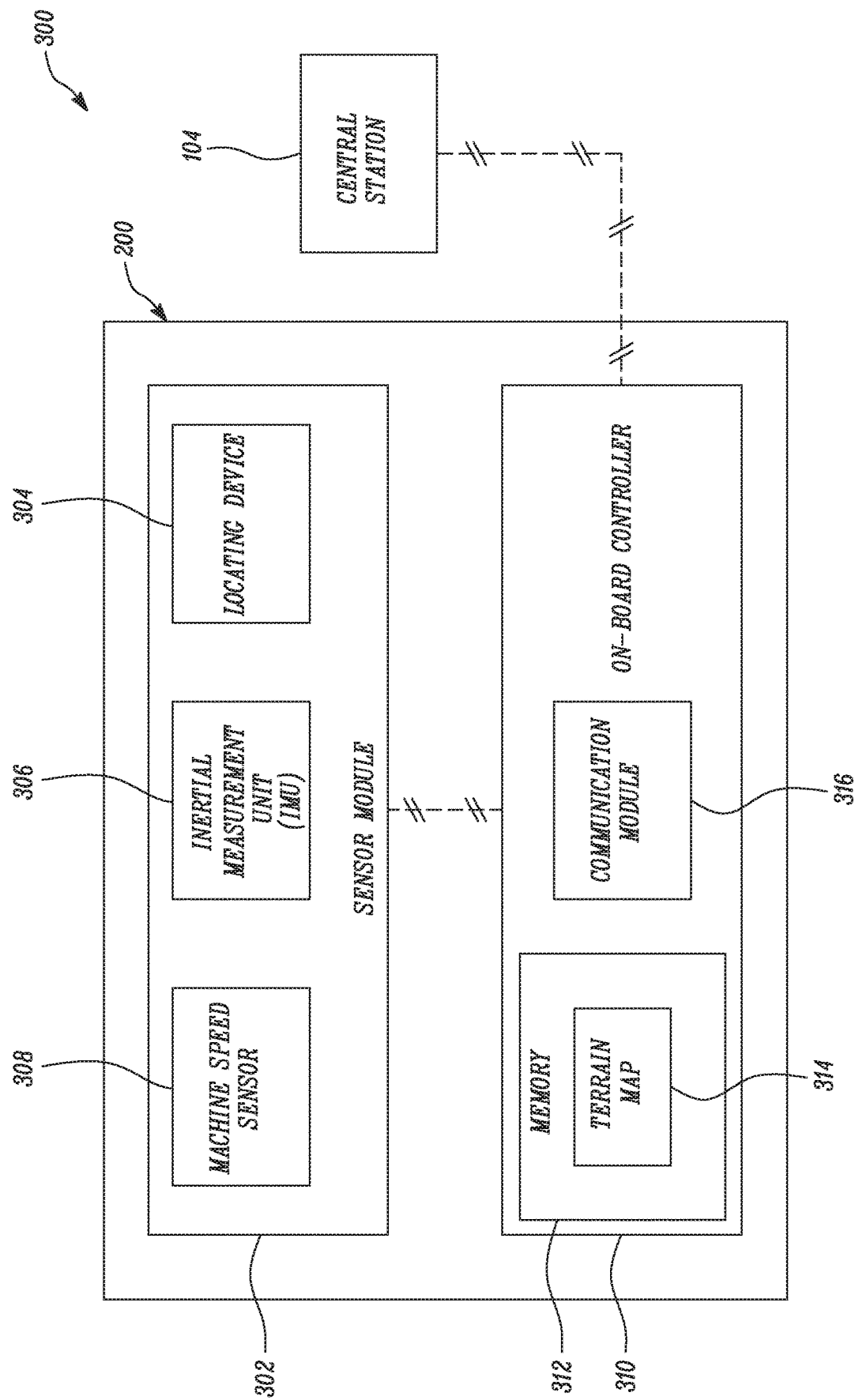
FIG. 3 shows a block diagram schematically depicting a worksite management system corresponding to FIG. 2, according to an aspect of the present disclosure.

FIG. 3 shows a block diagram of a worksite management system 300. The machine 200 and the central station 104 together embody the worksite management system 300. The machine 200 is schematically illustrated. The machine 200 includes a sensor module 302. The sensor module 302 may be configured to collect data corresponding to the haul route 202 over which the machine 200 is travelling such as one or more conditions of the haul route 202, location of the machine 200 on the worksite 100 etc. The sensor module 302 may also be configured to collect data regarding various operational parameters of the machine 200 while the machine 200 is working on the worksite 100. The operational parameters may include payload of the machine 200, machine speed, driving gear, mechanical vibrations, etc. The operational parameters listed here are only to be considered in an indicative manner. The present disclosure is not limited by the listed operational parameters in any manner.

The sensor module 302 includes at least one locating device 304. The locating device 304 may be configured to determine a location of the machine 200 at the worksite 100. The locating device 304 generates a signal indicative of the location of the machine 200 on the worksite 100. The locating device 304 could embody, for example, a Global Positioning System (GPS) device, an Inertial Reference Unit (IRU), a local tracking system, or any other known locating device that receives or determines location information associated with the machine 200. The locating device 304 may be configured to convey a signal indicative of the received or determined location information to the central station 104 for processing. It is contemplated that the signal indicative of the location of the machine 200 may also be directed to one or more of user interface devices (e.g., to the monitor) for display of the location of the machine 200 in an electronic representation of the worksite 100, if desired.

The sensor module 302 includes at least one Inertial Measurement Unit (IMU) 306. The IMU 306 may allow a GPS receiver to function when GPS signals are unavailable at the worksite 100. The IMU 306 may also measure whole body vibrations of the machine 200 or machine component, e.g. seat. The IMU 306 may generate signals indicative of the whole-body vibrations of the machine 200, machine component, e.g. seat, or operator operating the machine. There may be more than one IMU 306 coupled to the machine 200. In one embodiment, the sensor module 302 includes two IMUs 306. One of the IMUs 306 may be coupled to the chassis 206 of the machine 200, and the other IMU 306 may be coupled to the operator cab 214. A difference between the signals of the two IMU 306 may be used to calculate vibration of the operator cab 214, and subsequently may be linked to operator discomfort.

The sensor module 302 further includes a machine speed sensor 308. The machine speed sensor 308 may measure the speed of the machine 200, and may generate signals indicative thereof. The machine speed sensor 308 may be any type of a speed sensor which may be suitable for use with various aspects of present disclosure. The present disclosure is not limited by type of the machine speed sensor 308 in any manner.

The machine 200 further includes an on-board controller 310. The on-board controller 310 may embody a single or multiple microprocessors, field programmable gate arrays (FPGAs), digital signal processors (DSPs), etc., that include a means for controlling operations of the machine 200 in response to operator requests, built-in constraints, sensed operational parameters, and/or communicated instructions from the central station 104. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

The on-board controller 310 includes a memory 312. The memory 312 could include any means to store data within the on-board controller 310, such as a hard disk. The memory 312 may be used to store a database containing among others, historical worksite conditions, machine and operator related data. In one embodiment, the memory 312 stores a pre-generated or learned terrain map 314 of the worksite 100. The pre-generated or learned terrain map 314 may include information about one or more conditions of the network of haul routes 110 on the worksite 100. For example, the terrain map 314 may be a pictorial representation of the worksite 100 having markers indicative of a pothole, or a ditch, or any other rough areas present on the network of haul routes 110.

The on-board controller 310 may include a communication module 316. The communication module 316 may include any device that facilitates communication of data between the machine 200 and the central station 104, and/or between the plurality of machines 102. The communication module 316 may include hardware and/or software that enables sending and/or receiving data through a wireless communication link. It is contemplated that, in some situations, the data may be transferred to the central station 104 and/or the other machines 102 through a direct data link (not shown), or downloaded from the machine 200 and uploaded to the central station 104, if desired. It is also contemplated that, in some situations, the data automatically monitored by the on-board controller 310 may be electronically transmitted, while an operator-observed data may be communicated to the central station 104 by a voice communication device, such as a two-way radio (not shown).

The on-board controller 310 is communicably coupled to the sensor module 302. The on-board controller 310 receives signals generated by the locating device 304 of the sensor module 302 indicative of the location of the machine 200 on the worksite 100. The on-board controller 310 may process the signals indicative of the location of the machine 200, and determine the location of the machine 200 on the worksite 100. The on-board controller 310 may look-up the received location of the machine 200 in the terrain map 314 stored in the memory 312 of the on-board controller 310. The on-board controller 310 may use any known database querying techniques known in the art to send a query to the terrain map 314, and retrieve data stored against the looked-up location.

The on-board controller 310 may identify at least one condition of the haul route 202 at the looked-up location based on an information included in the terrain map 314. The terrain map 314 may include information regarding one or more conditions of the haul route 202 at the looked-up location of the worksite 100. The condition of the haul route 202 may include one or more rough areas on the haul route 202 such as the presence of a ditch, a pothole, excessive dust conditions, rutting etc. The on-board controller 310 may then generate an alert for the operator of the machine 200 to perform one or more recommend actions. The alert may be generated in form of an audible alert, an alarm, a message to be displayed on the console, or a text message sent to the operator, or the central station 104.

The recommend actions may be defined with respect to an operating parameter of the machine 200 based on the identified condition of the haul route 202. The recommend actions may include controlling powertrain output of the machine 200. The powertrain output of the machine 200 may be reduced so as to reduce the speed of the machine 200, when the machine 200 is traversing the location on the worksite 100 with the at least one identified condition. The on-board controller 310 may control various components of the powertrain 212 to perform the recommend action. Recommend actions may include controlling the steering output of the machine 200 to avoid a location on the haul route 202.

The on-board controller 310 may continue to monitor various operating parameters of the machine 200, and may provide a feedback to an off-board controller 600 (shown in FIG. 6) about a subsequent action performed by the operator after the generation of alert. More specifically, the on-board controller 310 may communicate to the off-board controller 600 whether the operator reduced the speed of the machine 200 by controlling the powertrain output after receiving the alert.

Figure 4:
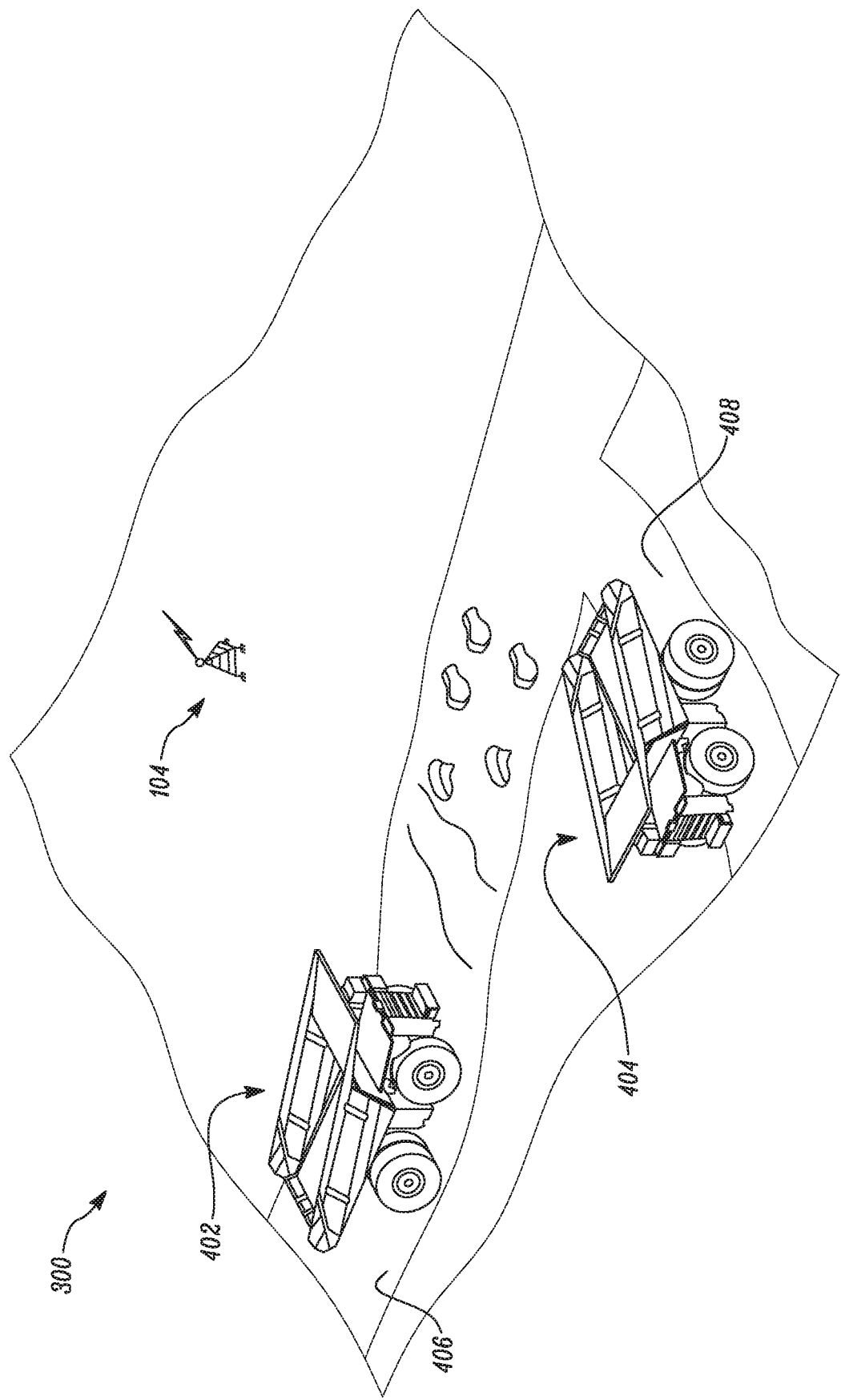
FIG. 4 shows two machines working on the worksite, according to an aspect of the present disclosure.

FIG. 4 illustrates another aspect of the worksite management system 300. The worksite management system 300 includes the multiple machines 102 operating on the network of haul routes 110. Only a first machine 402, and a second machine 404 are illustrated for the sake of clarity of explanation. However, it should be contemplated that there may be any number of machines 102 working on the worksite 100. The first machine 402 is illustrated as travelling on a first haul route 406, and the second machine 404 is illustrated as travelling on a second haul route 408. It should be understood that the first haul route 406 and the second haul route 408 are part of the network of haul routes 110. The first machine 402 may be configured to travel on the second haul route 408 after travelling on the first haul route 406. Similarly, the second machine 404 may be configured to travel on the first haul route 406 after travelling on the second haul route 408. It should be contemplated that the first machine 402 and the second machine 404 may also travel on any one of the first haul route 406, or the second haul route 408 at the same time. In one embodiment, the first haul route 406 and the second haul route 408 may be segments of a single haul route from the network of haul routes 110.

Figure 5:
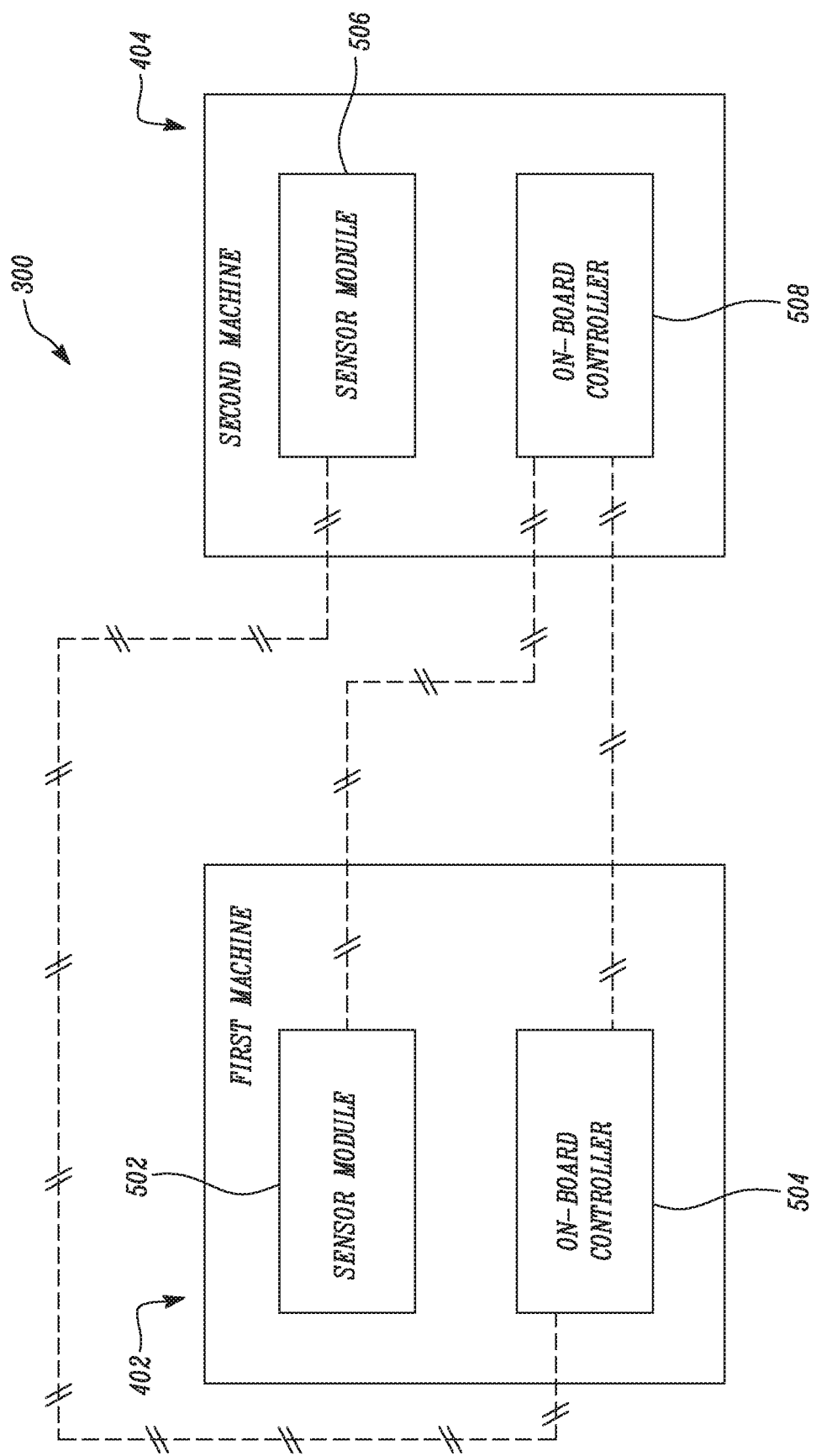
FIG. 5 shows a block diagram schematically depicting the worksite management system corresponding to FIG. 4, according to an aspect of the present disclosure.

FIG. 5 schematically illustrates the worksite management system 300 corresponding to the embodiment of the present disclosure depicted in FIG. 4. The first machine 402 includes associated sensor module 502 and associated on-board controller 504. The sensor module 502 may be configured to generate signals indicative of at least one condition of the first haul route 406. The condition of the first haul route 406 may include one or more rough areas such as presence of a pothole, a ditch, rutting, excessive dust conditions etc. The on-board controller 504 may be configured to receive the signals generated by the sensor module 502. Similarly, the second machine 404 includes associated sensor module 506 and associated on-board controller 508. The sensor module 506 may be configured to generate signals indicative of at least one condition of the second haul route 408. The condition of the second haul route 408 may include one or more rough areas such as presence of a pothole, a ditch, rutting, excessive dust conditions etc. The on-board controller 508 may be configured to receive the signals generated by the sensor module 504.

Further, the on-board controller 504 may also be configured to receive the signals indicative of the at least one condition of the second haul route 408. The on-board controller 504 may receive the signals indicative of the at least one condition of the second haul route 408 directly from the sensor module 506, or from the on-board controller

508. Similarly, the on-board controller 508 may also be configured to receive the signals indicative of the at least one condition of the first haul route 406. The on-board controller 508 may receive the signals indicative of the at least one condition of the first haul route 406 directly from the sensor module 502, or from the on-board controller 504. The on-board controller 504 may then analyze the received signals, and identify a location of one or more rough areas on the first haul route 406. The on-board controller 504 may identify the location of the one or more rough areas through a corresponding locating device included in the sensor module 502. Similarly, the on-board controller 508 may also analyze the received signals, and identify a location of one or more rough areas on the second haul route 408. The on-board controller 504 may identify the location of the one or more rough areas through the locating device included in the sensor module 502.

In another embodiment, the first machine 402 and the second machine 404 may be travelling on the first haul route 406. The on-board controller 504 may receive the signals indicative of the condition of the first haul route 406 from the sensor module 502, and the sensor module 506. The on-board controller 504 may also receive the signals indicative of the condition of the first haul route 406 from the on-board controller 508. The on-board controller 504 may then analyze the received signals, and identify the location of one or more rough areas on the first haul route 406. The on-board controller 504 may identify the location of the one or more rough areas through the locating device included in the sensor module 502.

The on-board controller 504 may then generate an alert for the operator of the first machine 402 about the identified location of the one or more rough areas on the first haul route 406. The on-board controller 504 may then perform the one or more recommend actions with respect to the operating parameter of the first machine 402 based on the identified location of the one or more rough areas on the first haul route 406. The alert may be generated in form of an audible alert, an alarm, a message to be displayed on the console, or a text message sent to the operator, or the central station 104. The one or more recommend actions may include reducing the powertrain output, and subsequently reducing the speed of the first machine 402. The on-board controller 508 may also perform similar functions for the second machine 404.

Figure 6:
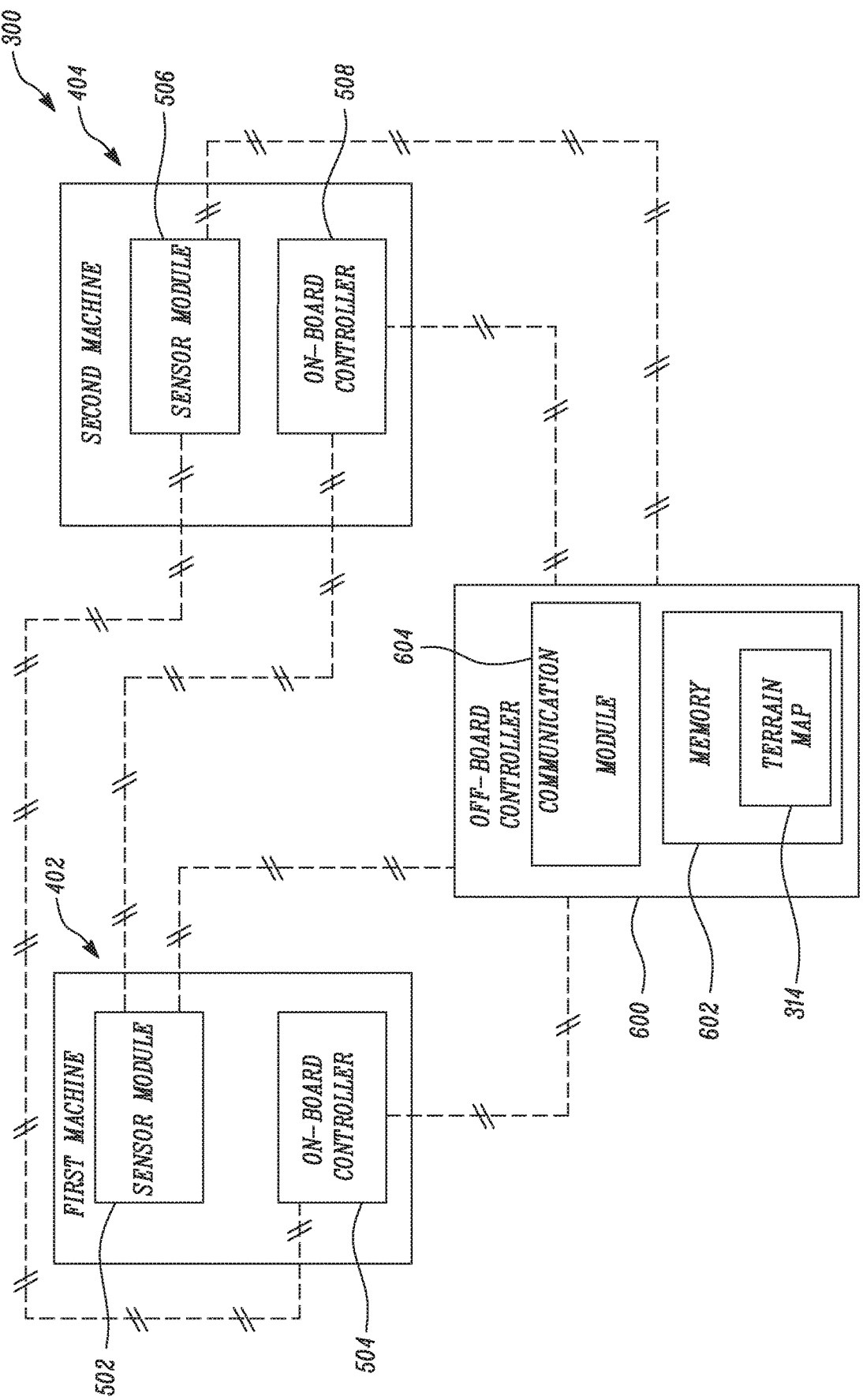
FIG. 6 shows a block diagram of the worksite management system, according to another aspect of the present disclosure.

FIG. 6 illustrates another aspect of the worksite management system 300. The central station 104 includes the off-board controller 600 in remote communication with the machines 102 via the central station 104. The off-board controller 600 may be configured to process data from a variety of sources and execute management methods at the worksite 100. The off-board controller 600 may include any type of a computer or a plurality of computers networked together. The off-board controller 600 may be located proximate the worksite 100 or may be located at a considerable distance remote from the mining operation, such as in a different city or even a different country. It may also be contemplated that computers at different locations may be networked together to form the off-board controller 600, if desired.

The off-board controller 600 may embody a single or multiple microprocessors, field programmable gate arrays (FPGAs), digital signal processors (DSPs), etc., that include a means for controlling operations of the machine 102 in response to operator requests, built-in constraints, sensed operational parameters, and/or communicated instructions from the central station 104. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

The off-board controller 600 includes a memory 602. The memory 602 could include any means to store data within the off-board controller 600, such as a hard disk. The memory 602 may be used to store a database containing among others, historical worksite conditions, machine and operator related data. In one embodiment, the memory 602 stores the pre-generated terrain map 314 or the learned terrain map 314 of the worksite 100. The terrain map 314 may include information about one or more conditions of the network of haul routes 110 on the worksite 100. For example, the terrain map 314 may be a pictorial representation of the worksite 100 having markers indicative of a pothole, or a ditch, or any other rough areas on the network of haul routes 110.

The off-board controller 600 may include a communication module 604. The communication module 604 may include any device that facilitates communication of data between the machines 102 and the central station 104. The communication module 604 may include hardware and/or software that enables sending and/or receiving data through a wireless communication link. It is contemplated that, in some situations, the data may be transferred to the central station 104 and/or the other machines 102 through a direct data link (not shown), if desired.

Although, the worksite management system 300 may have any number of machines 102, only the first machine 402 and the second machine 404 are illustrated for the sake of clarity of explanation. The on-board controller 504 of the first machine 402 communicates the identified location of the one or more rough areas to the off-board controller 600. The on-board controller 508 of the second machine 404 also communicates the identified location of the one or more rough areas to the off-board controller 600. The off-board controller 600 may receive the identified location of the one or more rough areas from other machines 102 working on the worksite 100 as well.

The off-board controller 600 determines if the received identified location of the one or more rough areas is included in the terrain map 314 of the worksite 100. For example, the off-board controller 600 may receive a location of a rough area from the first machine 402. The off-board controller 600 may then query the terrain map 314 to check whether the location of the rough area is included in the map 314. If the location of the rough area is included in the terrain map 314, the off-board controller 600 further checks other such received locations. If the location of the rough area is not included in the terrain map 314, the off-board controller 600 may update the terrain map 314 to include the identified location of the one or more rough areas. The off-board controller 600 may further be configured to communicate the updated terrain map 314 to the first machine 402 and the second machine 404. The off-board controller 600 may communicate the updated terrain map 314 to any other machines 102 working on the worksite 100 as well.

Figure 7:
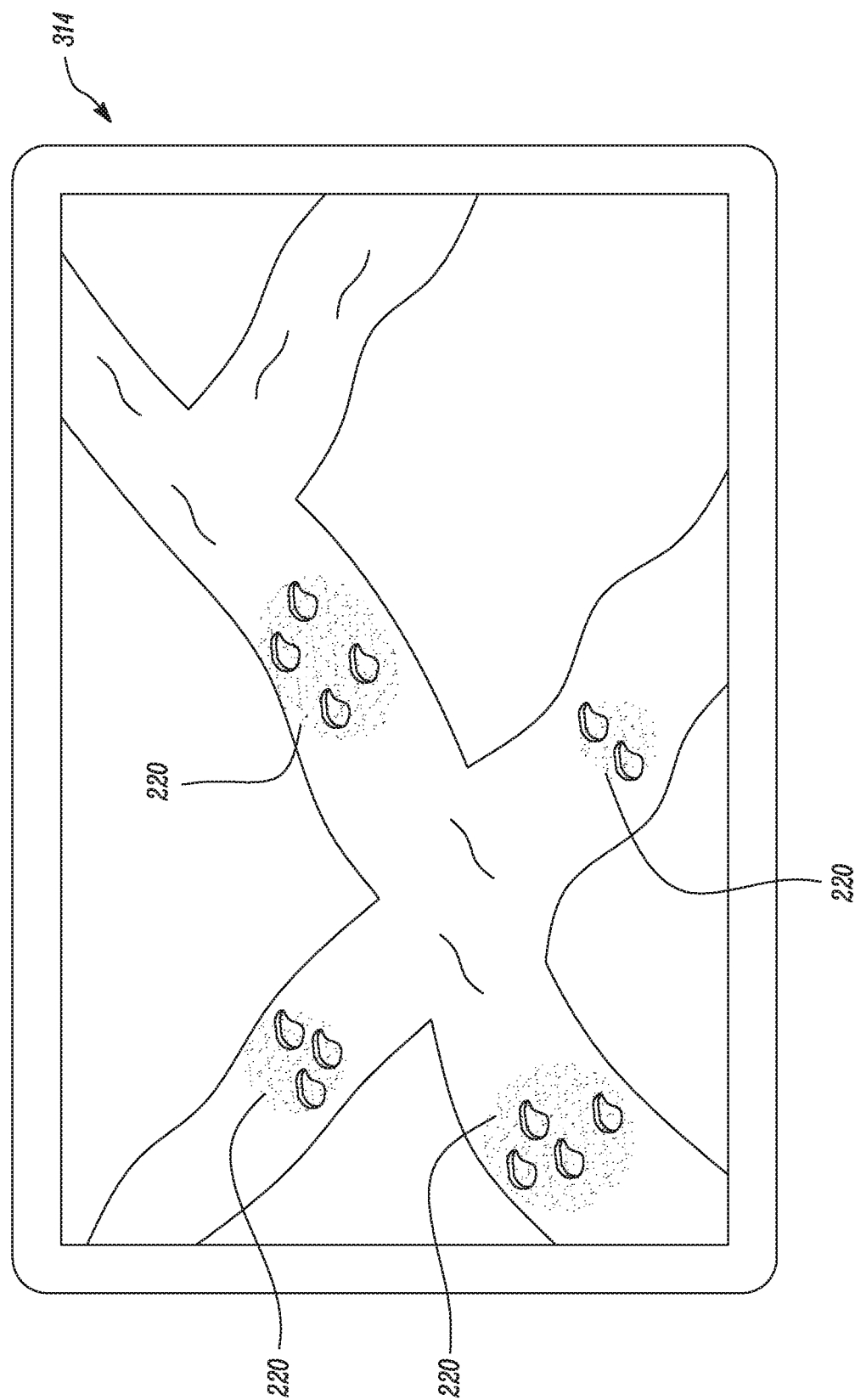
FIG. 7 shows a terrain map of the worksite indicating rough areas on the network of haul routes, according to an aspect of the present disclosure.

FIG. 7 illustrates an exemplary terrain map 314 being displayed on a display. The display may be associated with an on-board controller of any of the machines 102, or the off-board controller 600. The terrain map 314 is a pictorial representation of the worksite 100. The terrain map 314 shows the network of haul routes 110. The terrain map 314 shows the one or more rough areas 220 depicted by shaded regions on the network of haul routes 110. In an embodiment, a size of the shaded region may be indicative of severity of the rough areas 220. The shaded region represents the location of the rough area on the worksite 100, as well as the severity of the rough area 220.

The off-board controller 600 may further be configured to define operating parameter limits for each of the machines 102, while the machines 102 traverse the one or more rough areas 220 on the network of haul routes 110 on the worksite 100. The operating parameter limits may include machine speed limit, driving gear suggestions etc. The off-board controller 600 may also be configured to redefine path followed by the machines 102 after taking into account the location of the one or more rough areas 220 on the network of haul routes 110.

The off-board controller 600 may perform further analysis on the received data from the machines 102. These analyses may include an economic analysis of the data to optimize haul route maintenance. For example, the analysis may compute the cost of repair of a route segment if performed immediately and compare it to the cost if the repair is performed after a certain period of time. The analysis may also identify rough areas that cause the most impact on route performance and overall productivity of the worksite 100. For example, the analysis may indicate that a particular rough area on a particular route segment causes the most damage to the machines 102 as compared to other rough areas. The analysis may also indicate the response of a machine operator to a particular rough area and the variation in the responses between different operators to the same rough area. For example, the data received from the machines 102 may indicate that the machine 102 uses too low a gear while traversing a particular level segment of a haul route.

Comparison with data received from other machines 102 from the same time period may indicate whether the low gear was in response to a rough area that the operator observed. Further comparison with historic data from the same route segment, may indicate how different operators responded to the same rough area. These comparisons may also indicate when the rough area was first observed and the whether the criticality of the rough area (and the response of the machine 102 to the rough area) worsens with time.

The analysis may also include computation of performance metrics. These performance metrics may include productivity, fuel efficiency, utilization, the mean time between failures, mean time to repair, haul route rough area free index, the cost per kilometer of haul vehicle operation and the cost per square meter of haulage route maintenance, age of the reported defects, traffic volumes over haul route segments, rolling resistance and roughness levels of haul route segments. The performance metrics may give an indication of the effectiveness of the maintenance or productivity of the network of haul routes 110. For example, an increased mean time between failures, decreased mean time to repair, and decreased cost per kilometer of haul vehicle operation all may indicate a robust maintenance system for the network of haul routes 110.

The results of the analysis could be in the form of detailed reports or they could summarize the results as a visual representation of haul route conditions such as, for example, with the terrain map 314. The results may also predict the progression of haul route damage, and estimate the time before the damage exceeds a preset limit. A route management team may use the results to prioritize and schedule haul route maintenance, and issue a haul route maintenance request. In generating the haul route maintenance request, the management team may use the terrain map 314 to study the haul route condition statistics of different haul route sections and frequency of route use. In some instances, the route management team may wholly or partly follow the recommended list of route repairs which may be made by the off-board controller 600.

The route maintenance request may be issued directly by the management team, or may be automatically issued by the off-board controller 600 with or without the approval of the management team. For example, if route repair equipment schedule logs are linked to the off-board controller 600, the off-board controller 600 may automatically schedule haul route maintenance in the equipment schedule logs. In some instances, previously scheduled haul route maintenance may be rescheduled based upon new priorities. After a rough area is repaired, information corresponding to the location of repaired rough area may be updated in the terrain map 314.

The off-board controller 600 may be configured to perform numerous such control actions which may improve the efficiency of the worksite 100. It should be contemplated that the present disclosure is not limited by any such actions in any manner.

INDUSTRIAL APPLICABILITY

Figure 8:
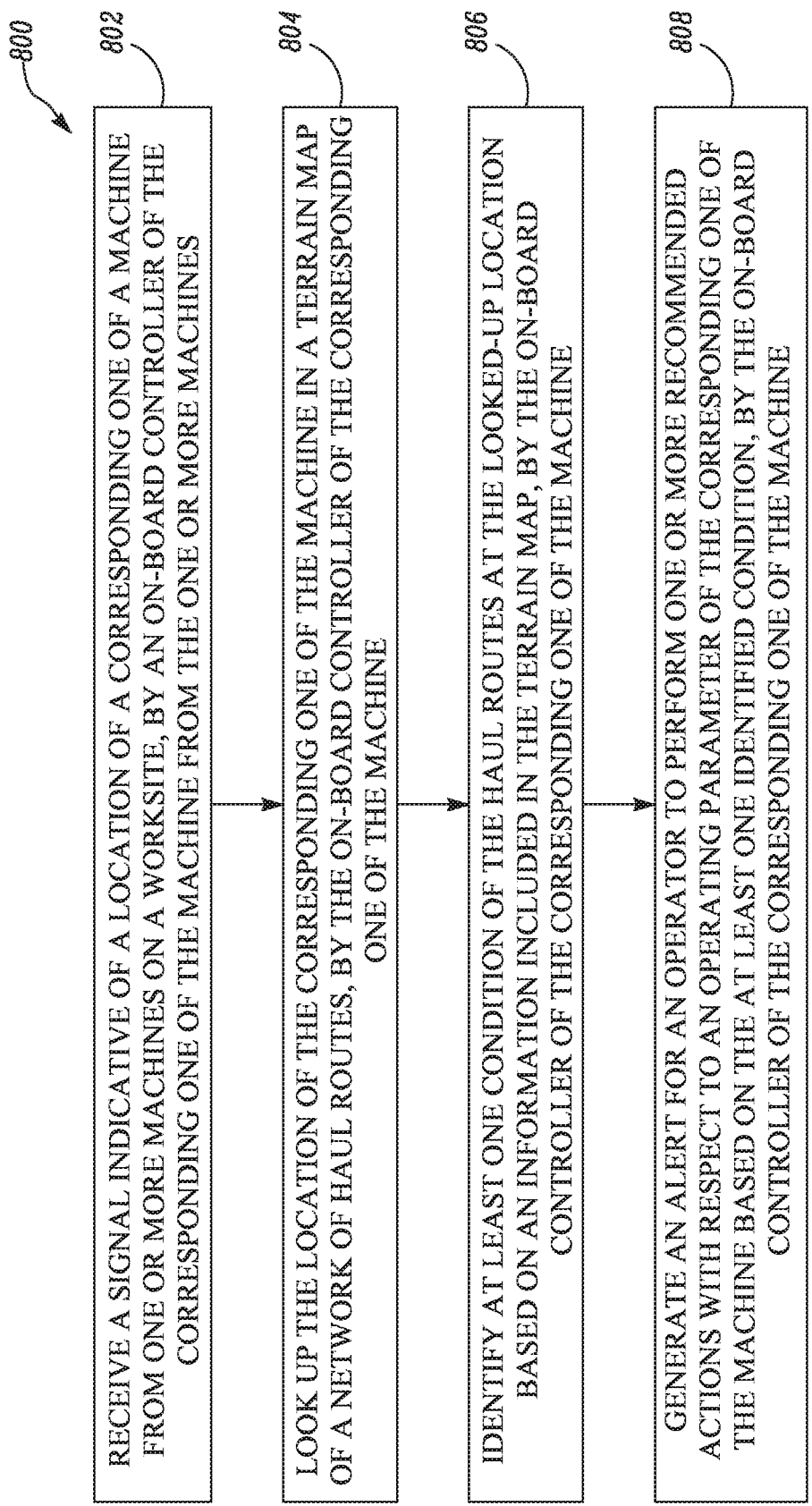
FIG. 8 shows a flow chart for a method of managing the worksite, according to an aspect of the present disclosure.

The present disclosure provides a method 800 of managing the worksite 100. The method 800 is illustrated with help of a flow chart shown in FIG. 8. The worksite 100 has the one or more machines 102 operating on the network of haul routes 110. Each of the one or more machines 102 include the corresponding on-board controller 310 having the pre-generated or learned terrain map 314 of the network of haul routes 110 stored in the memory 312 of the on-board controller 310. For the sake of clarity, the method 800 will be explained with respect to the machine 200 having the associated on-board controller 310. However, it should be contemplated that there may be any number of machines 102 operating at the worksite 100.

At step 802, the on-board controller 310 of the machine 200 receives the signal indicative of the location of the machine 200. The signal indicative of the location may be generated by the sensor module 302 of the machine 200. At step 804, the on-board controller 310 of the machine 200 looks up the location of the machine 200 in the terrain map 314 of the network of haul routes 110. The on-board controller 310 may use any of the conventional database querying methods to query the location of the machine 200 in the terrain map 314 of the network of haul routes 110.

At step 806, the on-board controller 310 identifies at least one condition of the first haul route 406 at the looked-up location based on the information included in the terrain map 314. The at least one condition may be one or more rough areas on the network of haul routes 110 at the looked-up location. At step 808, the on-board controller 310 generates the alert for the operator to perform the one or more recommend actions with respect to the operating parameter of the machine 200 based on the at least one identified condition. The one or more recommend actions may include reducing the powertrain output to reduce the speed of the machine 200 based on the alert.

Another embodiment of the present disclosure may be envisioned with considering the first machine 402 and the second machine 404 working on the worksite 100 over the first haul route 406 and the second haul route 408 respectively. It should be contemplated that only the first machine 402 and the second machine 404 are being considered for the sake of clarity of explanation. There may be any number of machines 102 working on the worksite 100. The method 800 may further include receiving the signals corresponding to the at least one condition of the first haul route 406 from the sensor module 502 of the first machine 402 by the on-board controller 504 of the first machine 402. The on-board controller 504 may receive signals corresponding to the at least one condition of the first haul route 406 from the sensor module 506 of the second machine 404. The second machine 404 may also work on the first haul route 406 along with the first machine 402.

The on-board controller 504 of the first machine 402 may analyze the signals received by the sensor module 502 of the first machine 402, and the second machine 404, and then identify the location of one or more rough areas on the first haul route 406 based on the analysis. The on-board controller 504 of the first machine 402 may further generate the alert for the operator of the first machine 402 about the identified location of the one or more rough areas to perform the one or more recommend actions with respect to the operating parameters of the first machine 402 based on the identified location.

The method 800 may further include the on-board controller 504 of the first machine 402 providing a feedback to the off-board controller 600 about the action performed by the operator based on the generated alert. The off-board controller 600 may determine whether the identified location of the one or more rough areas is included in the terrain map 314. If the identified location of the one or more rough areas is not included in the terrain map 314, the off-board controller 600 may update the terrain map 314. The off-board controller 600 may then communicate the updated terrain map 314 to the machines 102 working on the worksite 100.

The present disclosure provides an improved system and method of managing the worksite 100. Powertrain output of each of the machines 102 is individually controlled as per the condition of the network of haul routes 110. More specifically, speed of the machine 102 is reduced based on the presence of one or more rough areas on the network of haul routes 110. Powertrain output may be increased, or a maximum machine speed limit or threshold maybe lifted to increase productivity. The data regarding the condition of the network of haul routes 110 is collected through the machines 102, and shared between each of the machines 102 such that each of the machines 102 is dynamically updated about the condition of the network of haul routes 110.

Such a dynamic update is more effective in a situation when one of the machines 102 has passed a certain rough area on the network of haul routes 110, and passes on the data to other machines 102 regarding the rough area, as well as data indicative of operating parameters which may be used to suitably traverse the rough area. This transfer of data greatly increases awareness of the operator of the machines 102, and increases operator comfort as well as brings down maintenance cost of the machines 102.

The system and method of controlling the powertrain output of the machine 102 working on the worksite 100 based on the condition of the network of haul routes 110 may be beneficial in managing a rental fleet of machines. In such a situation, as the machine belongs to the rental fleet, the operator/driver may not drive the machine carefully so as to minimize the maintenance costs and maximize productivity. In such a situation, automatic powertrain control of the machine to reduce the speed while driving on the rough areas on the worksite 100 may minimize the maintenance costs of the machine or a machine speed limit maybe raised to increase productivity. The present disclosure provides an additional layer of control over the machine, which may be independent of operator driving behavior, which may help in managing the rental fleet in a better manner.

Further, the present disclosure also provides data regarding maintenance requirements of the network of haul routes 110, and also provides means for effective scheduling of the maintenance procedure of the network of haul routes 110. The terrain map 314 gets updated dynamically based on the identification of the rough areas, as well as the repairs of the network of haul routes 110. This dynamic updating of the haul route conditions may help planning the travel paths of the machines 102 in a better manner, which subsequently leads to increased productivity of the worksite 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A worksite management system for a worksite having a plurality of machines operating on a network of haul routes, the plurality of machines including at least a first machine and a second machine, the worksite management system comprising:
   a first sensor module associated with the first machine, wherein the first sensor module is configured to generate a first location signal indicative of a location of the first machine;
   a first on-board controller associated with the first machine and communicably coupled to the first sensor module, the first on-board controller having memory for including a terrain map of the network of haul routes;
   a second sensor module associated with the second machine, wherein the second sensor module is configured to generate a second location signal indicative of a location of the second machine;
   a second on-board controller associated with the second machine and communicably coupled to the second sensor module, the second on-board controller further being directly communicably coupled to the first on-hoard controller, wherein the second on-board controller has memory for including the terrain map of the network of haul routes;
   wherein the first on-board controller is configured to:
      receive the first location signal corresponding to the location of the first machine on the worksite;
      lookup the location of the first machine in the terrain map of the network of haul routes;
      identify a first segment of haul route free of rough areas, the machine being operable in the first segment without system involvement;
      identify a second segment of haul route having rough areas, the machine being operable in the second segment wherein the system is adapted to:
         identify at least one condition of a first haul route from the network of haul routes at the looked-up location based on an information included in the terrain map;
         generate an alert for an operator to perform one or more recommended actions with respect to an operating parameter of the first machine based on the at least one identified condition;

directly transfer a first condition signal corresponding to the at least one condition of the first haul route to the second on-board controller associated with the second machine;

directly receive a second condition sitznal corresponding to the at least one condition of the first haul route from the second on-hoard controller;

analyze the first and second condition signals corresponding to the at least one condition of the first haul rout;

identify a location of the at least one condition on the first haul route based on the analysis of the first and second condition signals; and control a speed of a powertrain of at least the first machine from analyzing the first and second condition signals based on the at least one condition of the first haul route.

2. The worksite management system of claim 1, wherein the first sensor module comprises at least one of:
a locating device;
an inertial measurement unit, and
a machine speed sensor.

3. The worksite management system of claim 1, wherein the at least one condition of the first haul route comprises one or more rough areas on the first haul route.

4. The worksite management system of claim 1, wherein the one or more recommended action comprises controlling a powertrain output of the first machine to reduce a speed while the first machine traverses on the location with the at least one identified condition.

5. The worksite management system of claim 1, wherein the first on-board controller s further configured to provide a feedback to an off-board controller about an action performed by the operator based on the generated alert.

6. The worksite management system of claim 1, wherein the first sensor module is further configured to generate a sensor-based signal indicative of the at least one condition of the first route.

7. The worksite management system of claim 3, wherein the first on-board controller is further configured to communicate the identified location of the one or more rough areas to an off-board controller.

8. The worksite management system of claim 7, wherein the off-board controller is configured to:
determine whether the identified location of the one or more rough areas is included in the terrain map;
update the terrain map based on the determination; and
communicate the updated terrain map to the plurality of machines on the worksite.

9. The worksite management system of claim 8, wherein the off-board controller is further configured to perfbrm analysis on received data from the machines to optimize haul routes.

10. The worksite management system of claim 9, wherein off-board controller analysis identifies rough areas that cause the most impact on route performance and overall productivity on the worksite.

11. The worksite management system of claim 10, wherein the off-board controller analysis is used to issue a route maintenance request to fix the rough areas that cause the most impact.

12. The worksite management system of claim 11, wherein the route maintenance request is issued automatically by the off-hoard controller.

* * * * *